(12) United States Patent
Sato et al.

(10) Patent No.: US 11,009,668 B2
(45) Date of Patent: May 18, 2021

(54) OPTICAL FIBER RIBBON AND OPTICAL FIBER CABLE

(71) Applicant: SUMITOMO ELECTRIC INDUSTRIES, LTD., Osaka (JP)

(72) Inventors: Fumiaki Sato, Osaka (JP); Hiroki Ishikawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/633,342

(22) PCT Filed: Jul. 23, 2018

(86) PCT No.: PCT/JP2018/027470
§ 371 (c)(1),
(2) Date: Jan. 23, 2020

(87) PCT Pub. No.: WO2019/021998
PCT Pub. Date: Jan. 31, 2019

(65) Prior Publication Data
US 2020/0150368 A1      May 14, 2020

(30) Foreign Application Priority Data
Jul. 24, 2017   (JP) .............................. JP2017-142904

(51) Int. Cl.
   *G02B 6/44*           (2006.01)
(52) U.S. Cl.
   CPC ......... *G02B 6/4404* (2013.01); *G02B 6/4403* (2013.01); *G02B 6/448* (2013.01); *G02B 6/44* (2013.01)

(58) Field of Classification Search
   CPC ...... G02B 6/44; G02B 6/4403; G02B 6/4404; G02B 6/448
   See application file for complete search history.

(56) References Cited

U.S. PATENT DOCUMENTS 7,574,088 B2      8/2009  Sugizaki et al.
10,094,995 B2 *  10/2018  Debban ............... G02B 6/4434
10,247,900 B2 *   4/2019  Murata .................... C08F 2/48
(Continued)

FOREIGN PATENT DOCUMENTS

JP      H02-154210 A    6/1990
JP      2002-189153 A   7/2002
(Continued)

*Primary Examiner* — Daniel Petkovsek
(74) *Attorney, Agent, or Firm* — Faegre Drinker Biddle & Reath LLP (57) ABSTRACT

An optical fiber ribbon includes N pieces of optical fibers in a state of being disposed in parallel. At least some parts of the N pieces of optical fibers contact each other and are connected to each other by a resin; an outer diameter of the optical fiber is equal to or larger than 0.135 mm and equal to or smaller than 0.180 mm; a connection part connected by the resin or another resin and a non-connection part not connected by the resin or another resin are intermittently provided in a longitudinal direction between intermittently connected core wires of an optical fiber disposed at the Mth and an optical fiber disposed at the (M+1)th among the N pieces of optical fibers; the N is a multiple of 12; and the M is a multiple of 4.

8 Claims, 6 Drawing Sheets

(56) References Cited

U.S. PATENT DOCUMENTS

| | | | |
|---|---|---|---|
| 10,704,985 B2 * | 7/2020 | Takahashi | G01M 11/37 |
| 2011/0110635 A1 | 5/2011 | Toge et al. | |
| 2013/0156390 A1 * | 6/2013 | Matsuzawa | G02B 6/4403 |
| | | | 385/114 |
| 2016/0161692 A1 | 6/2016 | Namazue et al. | |
| 2016/0299310 A1 * | 10/2016 | Kaneko | G02B 6/44 |
| 2017/0090135 A1 * | 3/2017 | Sato | G02B 6/4405 |
| 2017/0115461 A1 | 4/2017 | Namazue et al. | |
| 2017/0184803 A1 | 6/2017 | Namazue et al. | |
| 2017/0219792 A1 * | 8/2017 | Debban | G02B 6/448 |
| 2017/0299829 A1 * | 10/2017 | Hoshino | G02B 6/4411 |
| 2018/0031792 A1 * | 2/2018 | Risch | G02B 6/448 |
| 2018/0273427 A1 | 9/2018 | Tanaka et al. | |

FOREIGN PATENT DOCUMENTS

| | | |
|---|---|---|
| JP | 2004-206048 A | 7/2004 |
| JP | 2010-128069 A | 6/2010 |
| JP | 2012-234122 A | 11/2012 |
| JP | 2013-88617 A | 5/2013 |
| JP | 2014-228689 A | 12/2014 |
| WO | WO-2004/042446 A1 | 5/2004 |
| WO | WO-A1-2017-094560 | 6/2017 |

* cited by examiner

OPTICAL FIBER RIBBON AND OPTICAL FIBER CABLE

TECHNICAL FIELD

The present disclosure relates to an optical fiber ribbon and an optical fiber cable using the optical fiber ribbon.

The present application claims priority from Japanese patent application JP2017-142904 filed on Jul. 24, 2017, the content of which is hereby incorporated by reference into this application.

BACKGROUND ART

Patent Literature 1 discloses a ribbon in which a recessed part is formed in a jacket in response to a hollow between adjacent optical fibers and which is easily split at the recessed part.

Patent Literature 2 discloses a method of aligning the intervals of an optical fiber in an optical fiber ribbon using a small-diameter optical fiber (an outer diameter of a glass fiber is less than 125 μm).

Patent Literature 3 discloses a 4-core intermittently connected optical fiber ribbon including a structure of an intermittent pattern for each core in which a connection part in which adjacent optical fibers are connected to each other by an adhesive resin and a non-connection part in which the adjacent optical fibers are not connected to each other by the adhesive resin are intermittently provided in a longitudinal direction. The intermittently connected optical fiber ribbon is the small-diameter optical fiber, but a distance between the centers of the adjacent optical fibers is set to 250 μm which is a distance between the optical fibers of a related art (not a small diameter).

CITATION LIST

Patent Literature

Patent Literature 1: JP2004-206048
Patent Literature 2: JP2010-128069
Patent Literature 3: JP2013-88617

SUMMARY OF INVENTION

An optical fiber ribbon according to an aspect of the present disclosure, including:

N pieces of optical fibers in a state of being disposed in parallel, wherein at least some parts of the N pieces of optical fibers contact each other and are connected to each other by a resin, an outer diameter of the optical fiber is equal to or larger than 0.135 mm and equal to or smaller than 0.180 mm, a connection part connected by the resin or another resin and a non-connection part not connected by the resin or another resin are intermittently provided in a longitudinal direction between intermittently connected core wires of an optical fiber disposed at the Mth and an optical fiber disposed at the (M+1)th among the N pieces of optical fibers, the N is a multiple of 12, and the M is a multiple of 4.

An optical fiber cable according to an aspect of the present disclosure, including a plurality of the optical fiber ribbons, wherein core density obtained by dividing the number of optical fibers by a cross-sectional area of the optical fiber cable is equal to or higher than 6 cores/mm².

DESCRIPTION OF EMBODIMENTS

Problem to be Solved by the Present Disclosure

Since the optical fiber ribbon of Patent Literature 1 and Patent Literature 2 is not an intermittently connected type, it is difficult to make a folded state so that a cross-sectional shape becomes a desired shape. For example, as described in the optical fiber ribbon of Patent Literature 3, the intermittently connected optical fiber ribbon including the intermittent pattern structure for each core can be mounted in an optical fiber cable in the folded state so that the cross-sectional shape becomes the desired shape, but since the small-diameter optical fiber is arranged at intervals of an optical fiber of a related art, high density cannot be sufficiently achieved.

Therefore, it is desirable to use a multi-core optical fiber ribbon rather than the 4-core optical fiber ribbon disclosed in Patent Literature 3. On the other hand, in the intermittent pattern structure for each core as described above, since the optical fibers are separated from each other one by one during the work of splicing the optical fibers together, work efficiency may not be good when the multi-core optical fiber ribbons are spliced together.

An object of the present disclosure is to provide an optical fiber ribbon and an optical fiber cable using the optical fiber ribbon not only capable of improving the work efficiency when the optical fibers are spliced together in the multi-core optical fiber ribbon, but also capable of improving the mounting density of the optical fibers in the optical fiber cable.

Effect of the Present Disclosure

According to the present disclosure, it is possible not only to improve the work efficiency when the optical fibers are spliced together in the multi-core optical fiber ribbon, but also to improve the mounting density of the optical fibers in the optical fiber cable.

Description of Embodiments of the Present Disclosure

First, an embodiment of the present disclosure will be listed and described.

An optical fiber ribbon according to an aspect of the present disclosure, including:

(1) N pieces of optical fibers in a state of being disposed in parallel, wherein at least some parts of the N pieces of optical fibers contact each other and are connected to each other by a resin, an outer diameter of the optical fiber is equal to or larger than 0.135 mm and equal to or smaller than 0.180 mm, a connection part connected by the resin or another resin and a non-connection part not connected by the resin or another resin are intermittently provided in a longitudinal direction between intermittently connected core wires of an optical fiber disposed at the Mth and an optical fiber disposed at the (M+1)th among the N pieces of optical fibers, the N is a multiple of 12, and the M is a multiple of 4.

In the optical fiber ribbon according to the above-described configuration, even though the number of optical fibers is a multiple of 12 cores (12 cores or more), since the outer diameter of the optical fiber is small, rigidity can be lowered and a width of a tape can also be reduced. Thus, since bending distortion when bending is applied in a width direction of the optical fiber ribbon is reduced, for example, the optical fiber ribbon can be folded so that a cross-sectional shape thereof becomes a desired shape even in the case of an intermittent pattern structure every multiple of 4 cores (a structure in which the non-connection part is intermittently provided) instead of an intermittent pattern structure for each core.

In the case of the intermittent pattern structure every multiple of 4 cores, since the optical fibers can be spliced together in a tape state every multiple of 4 cores at the time of the splicing, the splicing work can be efficiently performed.

Since the optical fiber ribbon according the above-described configuration can reduce the thickness and width of the tape, it is possible not only to reduce the cross-sectional area of the optical fiber ribbon, but also to improve the mounting density of the optical fiber when the optical fiber ribbon is mounted in the optical fiber cable.

(2) A thickness of the optical fiber ribbon may be equal to or smaller than 0.21 mm, and a thickness of the resin may be equal to or larger than 0.005 mm.

According to the above-described configuration, since the thickness of the optical fiber ribbon is equal to or smaller than 0.21 mm, the cross-sectional area of the optical fiber ribbon can be reduced. Since the thickness of the resin is equal to or larger than 0.005 mm, there is an effect of not only preventing deterioration in characteristics when a side pressure is applied to the optical fiber ribbon, but also securing external damage resistance.

(3) The M may be a multiple of 12, and the N may be greater than the M.

According to the above-described configuration, it becomes easy to divide the optical fiber ribbon every 12 cores by forming the intermittent pattern structure every 12 cores. Normally, when the optical fiber ribbon is taken out from the optical fiber cable and distributed to an individual building and equipment, since the 12-core optical fiber ribbon is often used, the efficiency of taking-out work from the optical fiber cable can be improved when the optical fiber ribbon is easily divided every 12 cores.

(4) A distance between the centers of the optical fibers adjacent to each other in the N pieces of optical fibers may be equal to or larger than 0.135 mm and may be equal to or smaller than 0.180 mm.

According to the above-described configuration, the distance between the centers of the optical fibers is set to be equal to or larger than 0.135 mm and set to be equal to or smaller than 0.180 mm, and the optical fibers are caused to be adjacent to each other (no space between the optical fibers), whereby it is possible not only to make the cross-sectional area of the optical fiber ribbon smaller, but also to further improve the mounting density of the optical fiber when being mounted in the optical fiber cable.

(5) The resin may be formed of an inner layer resin and an outer layer resin, and the optical fiber disposed at the Mth and the optical fiber disposed at the (M+1)th may not be connected to each other by the inner layer resin in the longitudinal direction, but may be intermittently connected to each other by the outer layer resin in the longitudinal direction between the intermittently connected core wires.

According to the above-described configuration, since the resin is formed as a two-layer structure including the inner layer resin and the outer layer resin, and the outer layer resin is intermittently connected between the intermittently connected core wires, for example, the configuration can be easily realized in such a manner that the optical fiber ribbon in advance coated with the M-core inner layer resin is prepared and disposed in parallel, after which the outside thereof is coated with the outer layer resin. A space between the inner layer resins adjacent to each other is provided between the intermittently connected core wires, and intermittent processing is performed on the outer layer resin therebetween, whereby it is possible not only to make the optical fiber hard to be damaged, but also to easily perform the operation.

An optical fiber cable according to an aspect of the present disclosure, including (6) a plurality of the optical fiber ribbons according to any one of (1) to (5), wherein core density obtained by dividing the number of optical fibers by a cross-sectional area of the optical fiber cable is equal to or higher than 6 cores/mm$^2$.

Since the optical fiber ribbon of the configuration according to any one of the above-described (1) to (5) is mounted in the optical fiber cable, it is possible not only to improve the mounting density of the optical fiber, but also to set the core density of the optical fiber cable to be equal to or higher than 6 cores/mm$^2$.

(7) The plurality of optical fiber ribbons may be covered with a tube.

Since the optical fiber ribbon of the configuration according to any one of the above-described (1) to (5) is mounted in the optical fiber cable covered with the tube, it is possible to improve the mounting density of the optical fiber.

(8) A slot rod including a plurality of slot grooves, and the plurality of optical fiber ribbons are included, and the plurality of optical fiber ribbons may be respectively stored in the slot grooves.

Since the optical fiber ribbon of the configuration according to any one of the above-described (1) to (5) is mounted in the slot type fiber cable, it is possible to improve the mounting density of the optical fiber.

Details of Embodiments of the Present Disclosure

Hereinafter, specific examples of an optical fiber ribbon and an optical fiber cable according to embodiments of the present disclosure will be described with reference to the drawings.

The present disclosure is not limited to these examples, shown by the scope of the claims, and intended to include the meaning equivalent to the scope of the claims and all the modifications within the scope of the claims.

First Embodiment

An example of an optical fiber ribbon according to a first embodiment will be described with reference to FIGS. 1 and 2.

Figure 1:
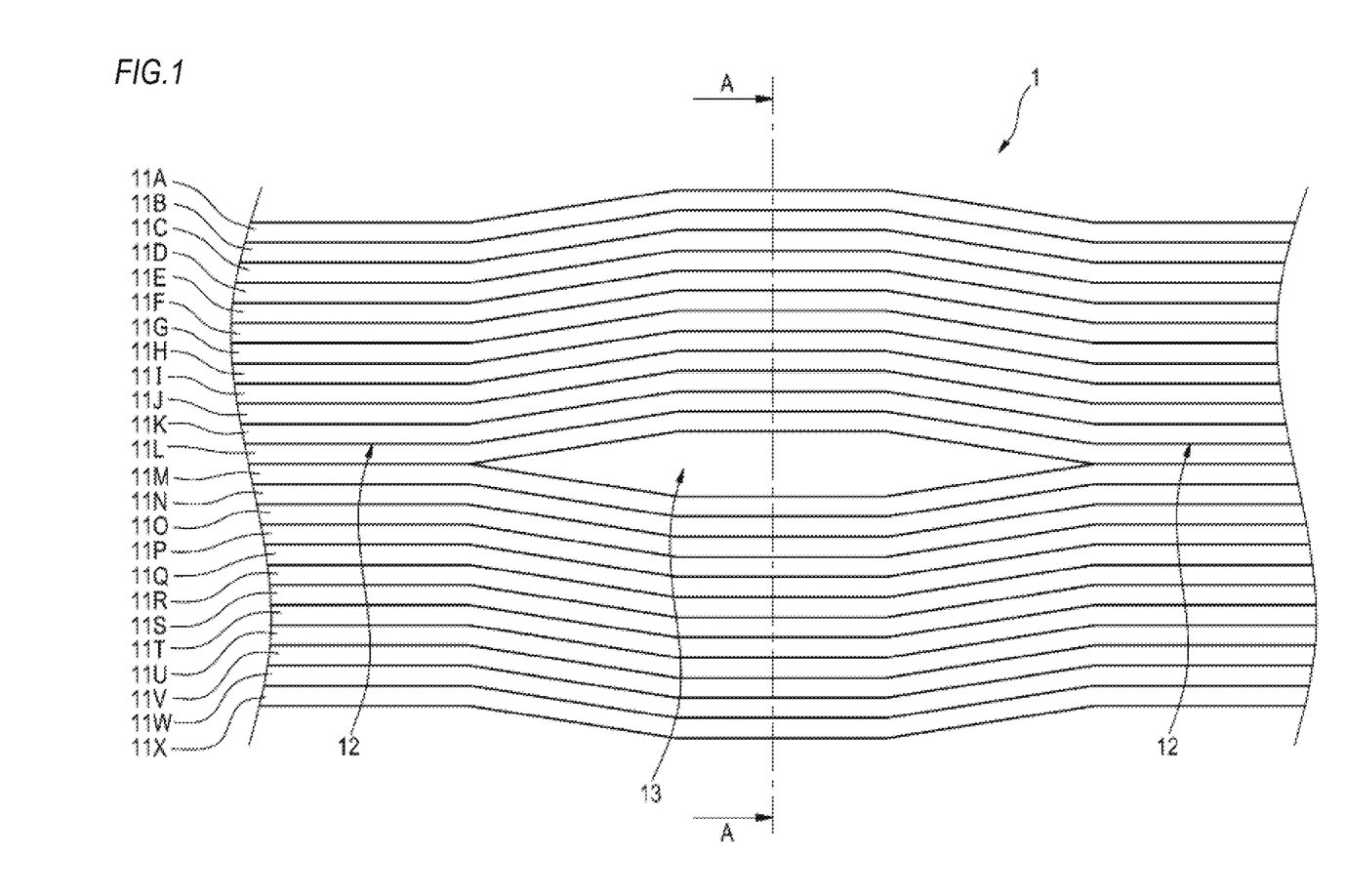
FIG. 1 is a plan view illustrating an example of an optical fiber ribbon according to a first embodiment.
Figure 2:
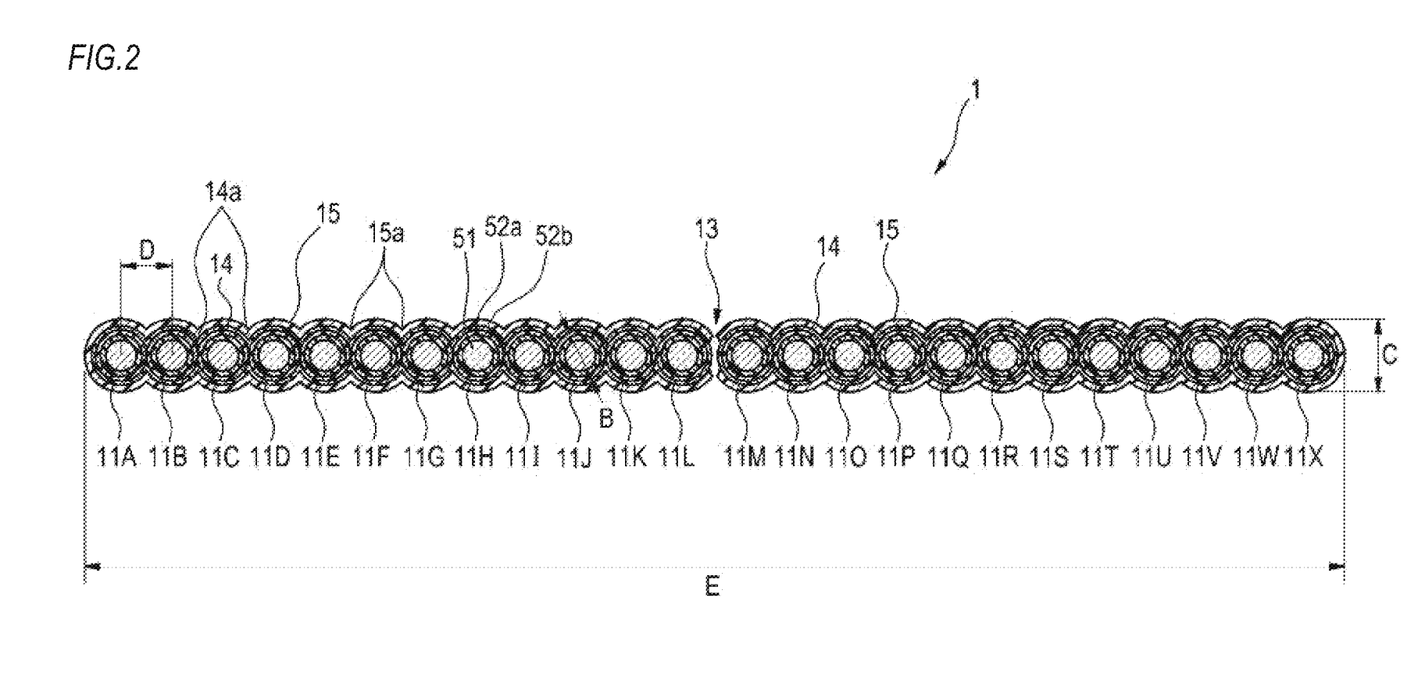
FIG. 2 is a cross-sectional view taken along the line A-A of the fiber ribbon illustrated in FIG. 1.

As illustrated in FIGS. 1 and 2, in the optical fiber ribbon 1, N pieces (24 pieces in this example) of optical fibers 11A to 11X are disposed in parallel. N is a multiple of 12. 24 pieces of the optical fibers 11A to 11X are connected to each other by a resin in such a manner that at least some parts of the adjacent optical fibers contact each other. In the optical fiber ribbon 1, a connection part 12 in which the optical fibers are connected to each other by the resin and a non-connection part 13 in which the optical fibers are not connected to each other by the resin are intermittently provided in a longitudinal direction between the core wires of an optical fiber disposed at the Mth and an optical fiber disposed at the (M+1)th. In this example, M is a multiple of 12, and M is smaller than N. In this case, N is an integer multiple of M.

In the optical fiber ribbon 1 of this example, the connection part 12 and the non-connection part 13 are provided between the core wires of an optical fiber 11L disposed at the 12th and an optical fiber 11M disposed at the 13th. Hereinafter, "between the core wires in which the connection part 12 and the non-connection part 13 are provided" is referred to as "between the intermittently connected core wires". The "between the intermittently connected core wires" is provided every 12 pieces of the optical fibers. FIGS. 1 and 2 illustrate the optical fiber ribbon 1 in a state where the non-connection part 13 is expanded in an arrangement direction of the optical fibers 11A to 11X.

Each of the optical fibers 11A to 11X is a coated optical fiber having, for example, a glass fiber 51 and two coating layers (an inner coating layer 52a and an outer coating layer 52b) coating the glass fiber 51. A diameter of the glass fiber 51 is equal to or larger than 80 μm and equal to or smaller than 120 μm. An outer diameter B of the optical fibers 11A to 11X is equal to or larger than 0.135 mm and is equal to or smaller than 0.180 mm.

The resin that connects the optical fibers 11A to 11X is formed with an inner layer resin 14 provided on an outer periphery of the optical fibers 11A to 11X and an outer layer resin 15 provided on an outer periphery of the inner layer resin 14.

Among 24 pieces of the optical fibers 11A to 11X, 12 pieces of the optical fibers 11A to 11L are disposed in parallel in a state of being in contact with each other, and are connected to each other by being collectively coated with the inner layer resin 14. In the same manner, 12 pieces of the optical fibers 11M to 11X are disposed in parallel in a state of being in contact with each other, and are connected to each other by being collectively coated with the inner layer resin 14. In the inner layer resin 14 that is collectively coted, a recessed part 14a is formed in response to a hollow formed between the core wires of the adjacent optical fibers.

The optical fibers 11A to 11L coated with the inner layer resin 14 and the optical fibers 11M to 11X coated with the inner layer resin 14 are disposed in parallel in a state where the inner layer resins 14 contact each other, and connected to each other by being collectively coated with the outer layer resin 15. That is, the optical fibers 11A to 11L coated with the inner layer resin 14 and the optical fibers 11M to 11X coated with the inner layer resin 14 are not connected to each other by the inner layer resin 14, but connected to each other by the outer layer resin 15. In the outer layer resin 15, the connection part 12 and the non-connection part 13 are intermittently provided in the longitudinal direction at a position between the core wires of the optical fiber 11L and the optical fiber 11M which is the "between the intermittently connected core wires". As described above, the "between the intermittently connected core wires" in the optical fiber ribbon 1 is intermittently connected in the longitudinal direction of the optical fiber ribbon 1 by the outer layer resin 15.

The resin may not be formed with a two-layer structure of the inner layer resin 14 and the outer layer resin 15, or may be a single layer resin, and in the single layer resin, the connection part 12 and the non-connection part 13 may be intermittently provided in the longitudinal direction at the position between the core wires of the optical fiber 11L and the optical fiber 11M which is the "between the intermittently connected core wires".

The recessed part 15a is also formed in the outer layer resin 15 that is collectively coated in response to the hollow formed between the core wires of the adjacent optical fibers. The inner layer resin 14 for coating each of the optical fibers is provided between the core wires of the optical fiber 11L and the optical fiber 11M, and the optical fiber 11L and the optical fiber 11M are disposed apart from each other by a thickness of the inner layer resin 14.

A thickness C of the optical fiber ribbon 1 formed as described above is equal to or smaller than 0.21 mm. The thickness of the resin obtained by adding the inner layer resin 14 and the outer layer resin 15 is equal to or larger than 0.005 mm. A distance D between the centers of the adjacent optical fibers in the optical fibers 11A to 11X is equal to or larger than 0.135 mm and equal to or smaller than 0.180 mm. The inner layer resin 14 and the outer layer resin 15 are formed of, for example, an ultraviolet curable resin and a thermosetting resin. For the outer layer resin 15, a resin of a material having a larger elongation at break than that of the inner layer resin 14 is used. The outer layer resin 15 is formed of a soft resin having the large elongation, whereby the non-connection part 13 is easily formed in a predetermined length when intermittent processing is performed on the outer layer resin.

For example, in the case of the 24-core optical fiber ribbon 1, as an example, when the diameter B of the optical fibers 11A to 11X is set to 0.165 mm and the thickness C of the optical fiber ribbon 1 is set to 0.21 mm and a width E thereof is set to 4.4 mm, and when the shape of the cross-sectional area of the optical fiber ribbon 1 is simply approximated to a rectangle of 0.21 mm×4.4 mm, a cross-sectional area S1 thereof becomes 0.924 $mm^2$.

On the other hand, as an example, in the case of the 12-core optical fiber ribbon of the related art, when the diameter of the optical fiber is set to 0.25 mm, the thickness of the optical fiber ribbon is set to 0.3 mm, and a width thereof is set to 3.1 mm, in the same manner as described above, when the shape of the cross-sectional area is simply approximated to a rectangle of 0.3 mm×3.1 mm, a cross-sectional area S2 of the 12-core optical fiber ribbon of the related art becomes 0.93 $mm^2$.

As described above, in comparison with the number of core wires of the optical fiber ribbon, when the cross-sectional area of the optical fiber ribbon is equal, the number of optical fibers can be doubled as compared with the optical fiber ribbon of the related art by using the optical fiber ribbon 1 of the first embodiment.

Next, an example of a method of manufacturing the optical fiber ribbon 1 will be described.

12 pieces of the optical fibers 11A to 11L are disposed in parallel so that the adjacent optical fibers contact each other. The inner layer resin 14 is applied to the surfaces of the optical fibers 11A to 11L disposed in parallel, thereby connecting the optical fibers 11A to 11L. In the same manner, 12 pieces of the optical fibers 11M to 11X are disposed in parallel, and the inner layer resin 14 is applied to the surfaces thereof, thereby connecting the optical fibers 11M to 11X.

Next, the optical fibers 11A to 11L coated with the inner layer resin 14 and the optical fibers 11M to 11X coated therewith are disposed in parallel so that the inner layer resins 14 contact each other, after which the outer layer resin 15 is applied to the surface of the inner layer resin 14, thereby connecting the optical fibers 11A to 11X.

Next, the non-connection part 13 is formed by intermittently forming a slit with, for example, a rotary blade in the longitudinal direction of the outer layer resin 15 between the optical fiber 11L and the optical fiber 11M (between the intermittently connected core wires). Accordingly, the optical fiber ribbon 1 illustrated in FIGS. 1 and 2 is manufactured.

The manufacturing method is not limited to the method of forming an intermittent structure by forming the slit after the outer layer resin is applied, and the intermittent structure may be formed by intermittently applying the outer layer resin.

According to the optical fiber ribbon 1 including the above-described configuration, since a structure in which the non-connection part 13 is intermittently provided every 12 cores is formed, it becomes easy to divide the optical fiber ribbon 1 every 12 cores. Normally, when the optical fiber ribbon is taken out from the optical fiber cable and distributed to an individual building and equipment, the 12-core optical fiber ribbon is often used. For this reason, when the optical fiber ribbon 1 can be easily divided every 12 cores, it is possible to improve the efficiency of taking-out work from the optical fiber cable.

Since the outer diameter B of the optical fibers 11A to 11X is equal to or larger than 0.135 mm and equal to or smaller than 0.180 mm, even though the optical fiber ribbon 1 is a multiple of 12 cores (12 cores or more), the width can be reduced and rigidity can be reduced. Therefore, since bending distortion at the time of applying bending in a width direction of the optical fiber ribbon 1 can be reduced, it is possible to fold the cross-sectional shape so as to be a desired shape, for example, even in the case of the intermittent pattern structure every multiple of 12 cores instead of an intermittent pattern structure for each core. Further, since the thickness C of the optical fiber ribbon 1 is equal to or smaller than 0.21 mm, the cross-sectional area of the optical fiber ribbon 1 can be reduced. Therefore, it is possible to improve the mounting density of the optical fibers 11A to 11X when the optical fiber ribbon 1 is mounted in the optical fiber cable.

The thickness C of the optical fiber ribbon 1 is formed to be equal to or smaller than 0.21 mm, and the thickness of the resin is formed to be equal to or larger than 0.005 mm. Therefore, it is possible not only to suppress the deterioration in characteristics of the optical fibers 11A to 11X when a side pressure is applied to the optical fiber ribbon 1, but also to secure high external damage resistance.

The distance D between the centers of the optical fibers 11A to 11X can be set to be equal to or larger than 0.135 mm and equal to or smaller than 0.180 mm by arranging the optical fibers to be adjacent to each other. Accordingly, it is possible not only to further reduce the cross-sectional area of the optical fiber ribbon 1, but also to further improve the mounting density of the optical fibers 11A to 11X when being mounted in the optical fiber cable.

In the above-described example, the adjacent optical fibers 11L and 11M are not connected to each other by the inner layer resin 14 but are intermittently connected to each other by the outer layer resin 15. This structure can be implemented by coating the inner layer resin 14 with the outer layer resin 15, leaving an interval between the optical fibers 11L and 11M, and applying intermittent processing to the outer layer resin 15 therebetween, whereby the optical fibers 11L and 11M can be made hard to be damaged and the operation can be easily performed.

Second Embodiment

An example of an optical fiber ribbon according to a second embodiment will be described with reference to FIGS. 3 and 4. The same configuration as that of the optical fiber ribbon 1 according to the first embodiment will be denoted by the same reference sign, and the description thereof will be appropriately omitted.

Figure 3:
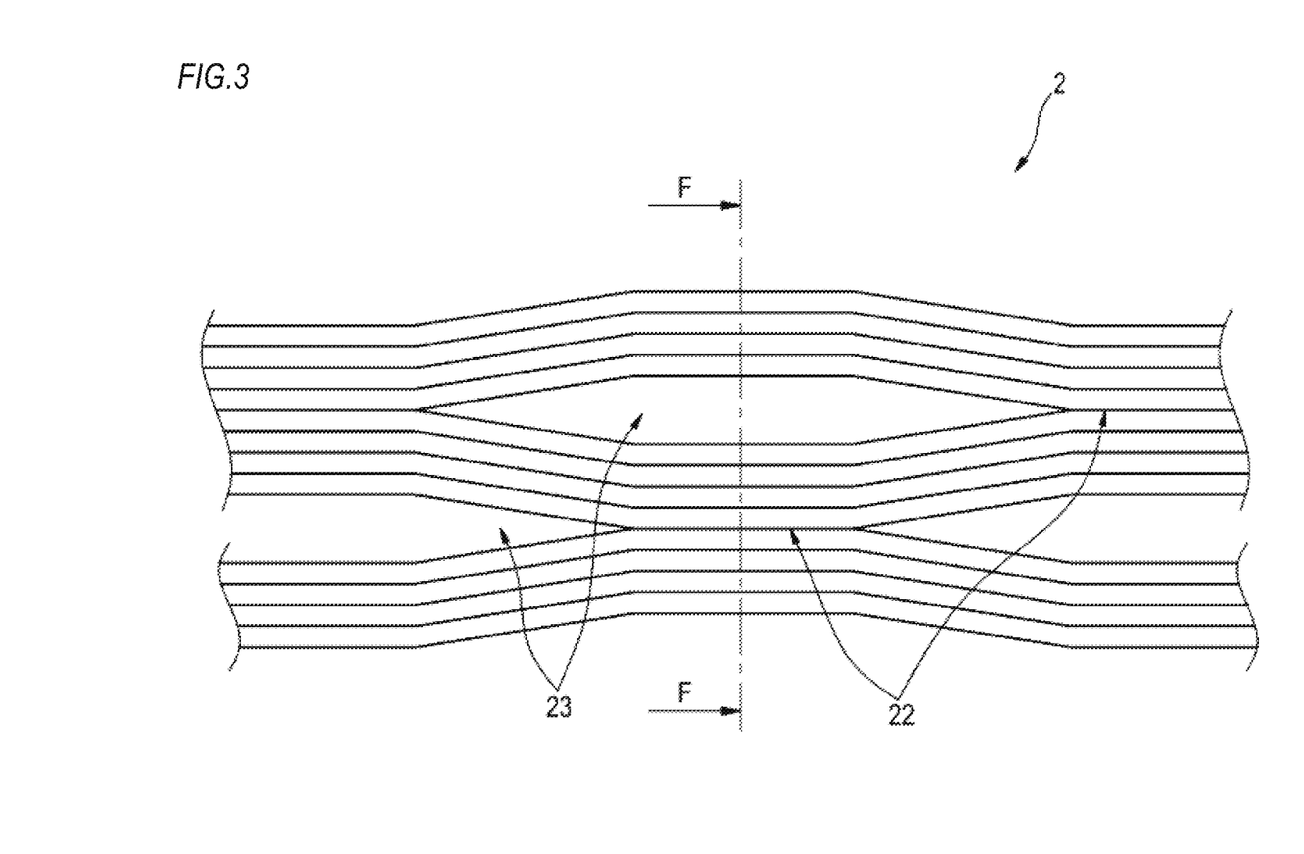
FIG. 3 is a plan view illustrating an example of an optical fiber ribbon according to a second embodiment.
Figure 4:
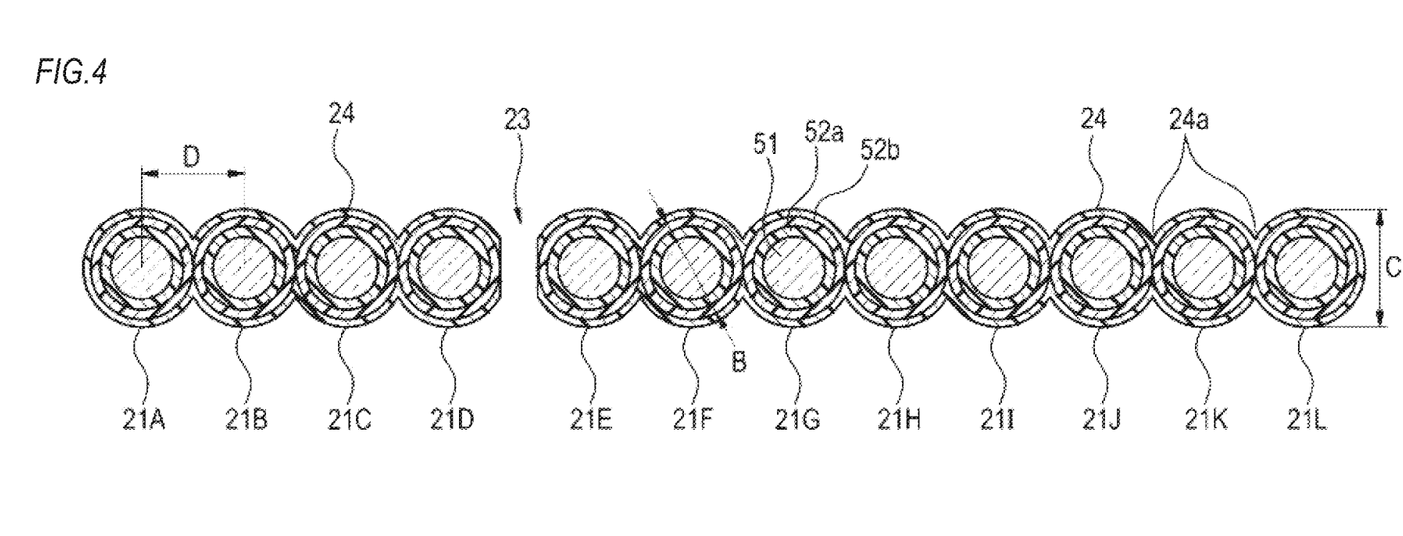
FIG. 4 is a cross-sectional view taken along the line F-F of the fiber ribbon illustrated in FIG. 3.

As illustrated in FIGS. 3 and 4, an optical fiber ribbon 2 includes N pieces (12 pieces in this example) of optical fibers 21A to 21L that are disposed in parallel. N is a multiple of 12. 12 pieces of the optical fibers 21A to 21L are connected to each other by a resin in such a manner that at least some parts of the adjacent optical fibers contact each other. In the optical fiber ribbon 2, a connection part 22 in which the optical fibers are connected to each other by the resin and a non-connection part 23 in which the optical fibers are not connected to each other by the resin are intermittently provided in a longitudinal direction between an optical fiber disposed at the Mth and an optical fiber disposed at the (M+1)th. In this example, M is a multiple of 4.

In the optical fiber ribbon 2 of this example, the connection part 22 and the non-connection part 23 are provided between the core wires of an optical fiber 21D disposed at the 4th and an optical fiber 21E disposed at the 5th, and the core wires of an optical fiber 21H disposed at the 8th and an optical fiber 21I disposed at the 9dth. The "between the intermittently connected core wires" is provided every 4 pieces of the optical fibers.

12 pieces of the optical fibers 21A to 21L are disposed in parallel in a state of being in contact with each other, and are connected to each other by being collectively coated with a resin 24. In the resin 24, the connection part 22 and the non-connection part 23 are intermittently provided in the longitudinal direction between the core wires of the optical fiber 21D and the optical fiber 21E and between the core wires of the optical fiber 21H and the optical fiber 21I, which are the "between the intermittently connected core wires". In the resin 24, a recessed part 24a is formed in response to a hollow formed between the core wires of the adjacent optical fibers.

The thickness C of the optical fiber ribbon 2 and the distance D between the centers thereof to be formed as described above are the same as those of the optical fiber ribbon 1 of the first embodiment. The thickness of the resin 24 is equal to or larger than 0.005 mm. The resin 24 is formed of, for example, an ultraviolet curable resin and a thermosetting resin.

In this example, the single layer resin 24 is provided, but for example, in the same manner as the first embodiment, the inner layer resin and the outer layer resin may be provided. It may be considered that the configuration of the resin (the inner layer resin and the outer layer resin) in the first embodiment may be formed as the single layer resin in this example.

Next, an example of a method of manufacturing the optical fiber ribbon 2 will be described.

12 pieces of the optical fibers 21A to 21L are disposed in parallel so that the adjacent optical fibers contact each other.

The resin 24 is applied to the surfaces of the optical fibers 21A to 21L disposed in parallel, thereby connecting the optical fibers 21A to 21L.

Next, the non-connection part 23 is formed by intermittently forming a slit with, for example, a rotary blade in the longitudinal direction of the resin 24 between the optical fiber 21D and the optical fiber 21E and between the optical fiber 21H and the optical fiber 21I. Accordingly, the optical fiber ribbon 2 illustrated in FIGS. 3 and 4 is manufactured.

According to the optical fiber ribbon 2 including the above-described configuration, since an intermittent pattern structure in which the non-connection part 23 is intermittently provided every 4 cores is formed, the splicing work of the optical fiber can be performed in a tape state every multiple of 4, thereby improving the work efficiency. With respect to a fact that the mounting density of the optical fibers 21A to 21L when the optical fiber ribbon 2 is mounted in the optical fiber cable can be improved, this fact is the same as that of the optical fiber ribbon 1 of the first embodiment described above. Even when the side pressure is applied to the optical fiber ribbon 2, the same effect as that of the first embodiment is achieved.

Next, an optical fiber cable in which the optical fiber ribbon 1 of the first embodiment or the optical fiber ribbon 2 of the second embodiment is mounted will be described. A case of a tube type optical fiber cable will be described with reference to FIG. 5, and a case of a slot type optical fiber cable will be described with reference to FIG. 6. In the following FIGS. 5 and 6, an example using the optical fiber ribbon 2 of the second embodiment will be described.

Figure 5:
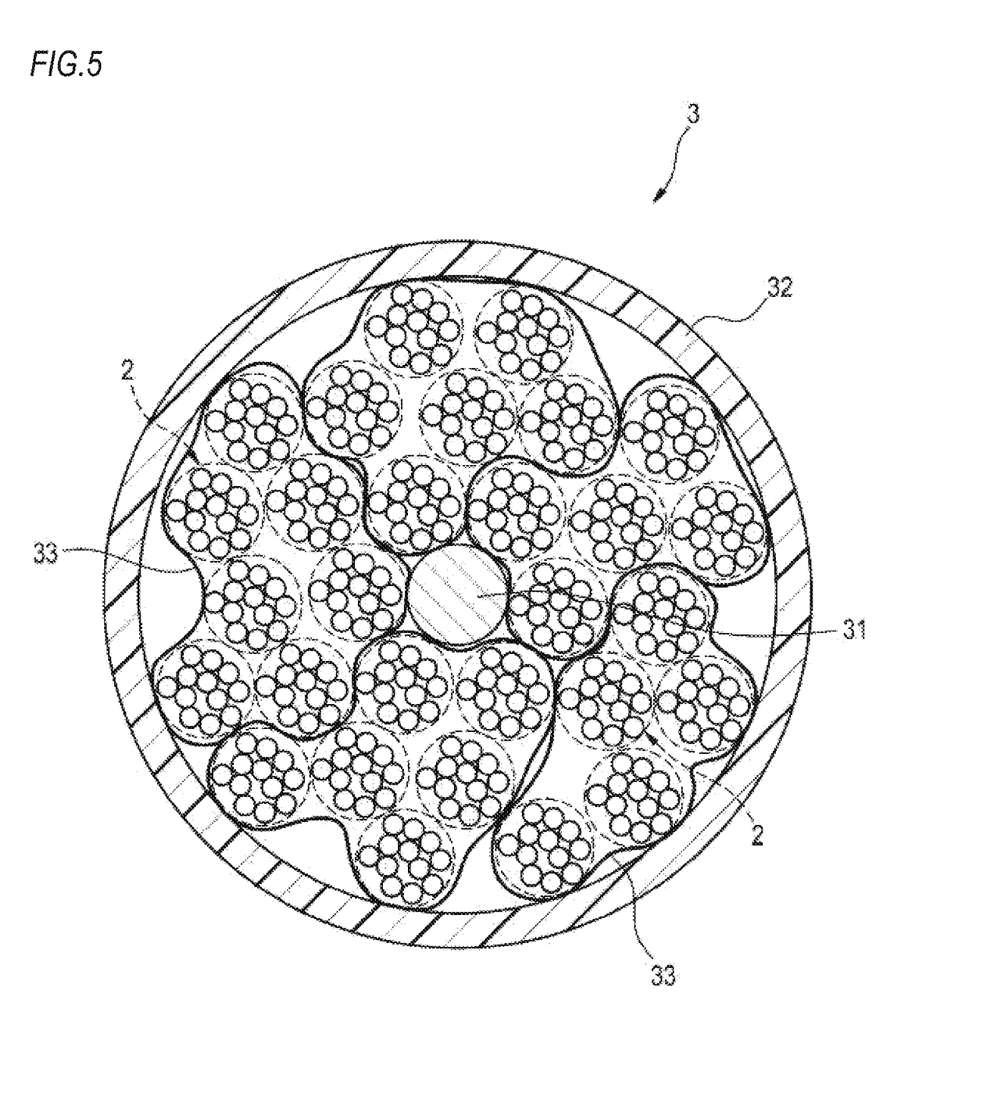
FIG. 5 is a cross-sectional view of a tube type optical fiber cable using the optical fiber ribbon of the embodiment.

FIG. 5 is a cross-sectional view illustrating an example of a tube type optical fiber cable in which the optical fiber ribbon 2 of the second embodiment is mounted.

As illustrated in FIG. 5, an optical fiber cable 3 includes a plurality of optical fiber ribbons 2, a tension member 31, and a cylindrical tube 32 covering the plurality of optical fiber ribbons 2 and the tension member 31. Each optical fiber ribbon 2 is folded so that the cross-sectional shape becomes a desired shape, and is bundled by an interposition 33 such as an aramid fiber every plural pieces. The tension member 31 is disposed along the longitudinal direction of the optical fiber cable 3 at a center part of the tube 32. The bundled optical fiber ribbons 2 are mutually twisted centering on the tension member 31. A resin to be the tube 32 is extruded and coated around the mutually twisted optical fiber ribbon 2. Even when the optical fiber ribbon 1 of the first embodiment is mounted in the optical fiber cable 3, the optical fiber ribbon 1 is folded so that the cross-sectional shape becomes a desired shape in the optical fiber cable 3, and then mounted therein.

Figure 6:
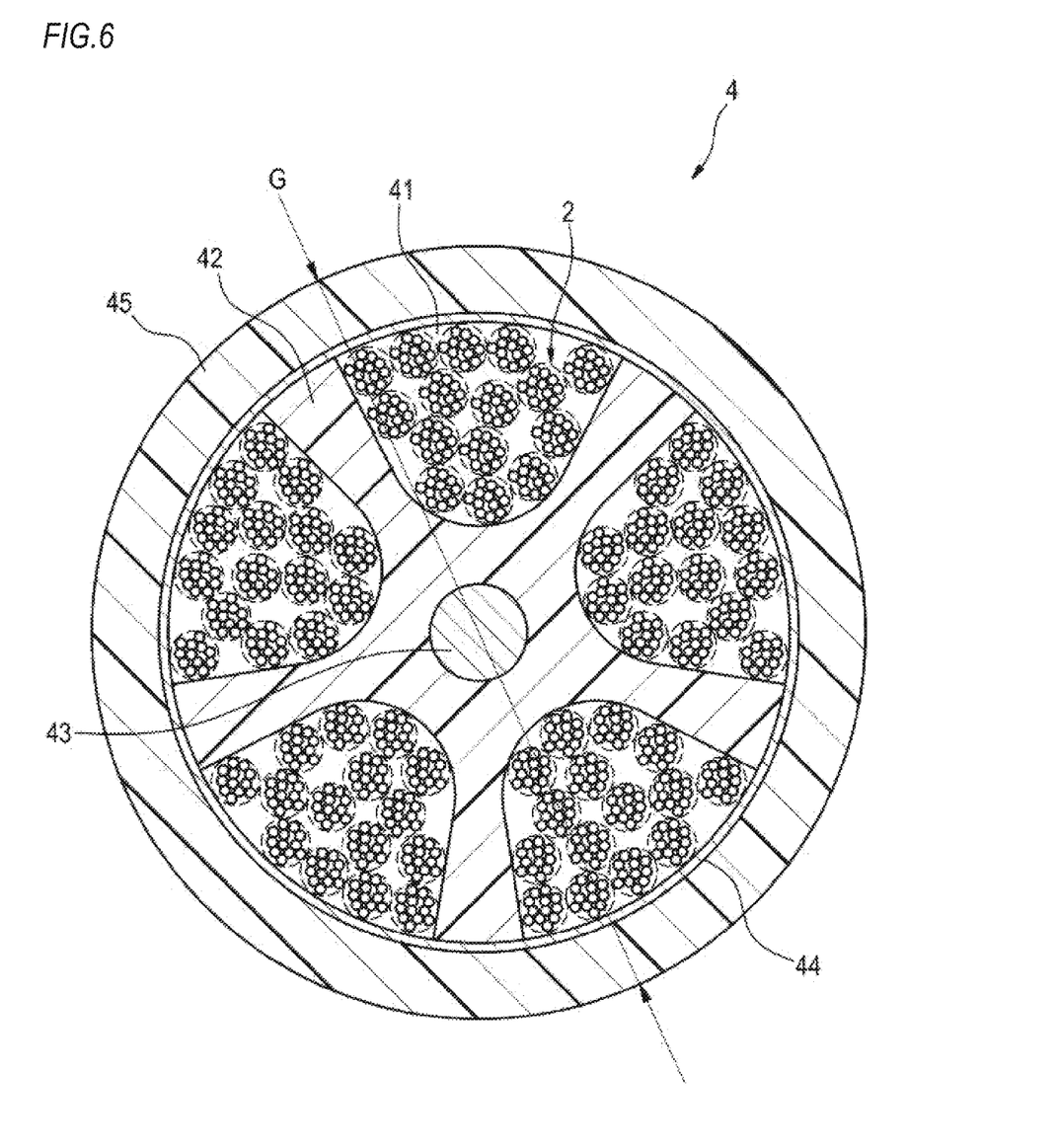
FIG. 6 is a cross-sectional view of a slot type optical fiber cable using the optical fiber ribbon of the embodiment.

FIG. 6 is a cross-sectional view illustrating an example of a slot type optical fiber cable in which the optical fiber ribbon 2 of the second embodiment is mounted.

As illustrated in FIG. 6, an optical fiber cable 4 includes a plurality of optical fiber ribbons 2 and a slot rod 42 including a plurality of slot grooves 41. The slot rod 42 includes a tension member 43 at the center, and is formed as a structure in which the plurality of slot grooves 41 are radially provided. Each optical fiber ribbon 2 is folded so that the cross-sectional shape becomes a desired shape, twisted, for example, in a spiral shape every plural pieces, and stored in the slot groove 41 in a unit state bundled with a bundle material for identification. A press-winding tape 44 is wound around the slot rod 42, and a jacket 45 is formed around the press-winding tape 44. Even when the optical fiber ribbon 1 of the first embodiment is mounted in the optical fiber cable 4, the optical fiber ribbon 1 can be folded in the optical fiber cable 4 so that the cross-sectional shape becomes a desired shape, and then mounted therein.

Here, core density of the optical fiber cable is defined in such a manner that the total number of optical fibers mounted in the optical fiber cable is divided by the cross-sectional area of the optical fiber cable (the number of optical fibers/the cross-sectional area of the optical fiber cable).

The core density of the optical fiber cable 3 or the optical fiber cable 4 is equal to or higher than 6 cores/mm². Specifically, for example, when the slot type optical fiber cable 4 illustrated in FIG. 6 is manufactured with an outer diameter G of 37 mm, the optical fiber including 6,912 cores can be mounted, and the core density thereof becomes 6.4 cores/mm². The core density of the optical fiber cable 3 or the optical fiber cable 4 becomes doubled (the "doubled" is not a strict value but a value having a certain width), for example, as compared with a case of using the 12-core optical fiber ribbon of the related art (the diameter of the optical fiber is 0.25 mm, the thickness of the optical fiber ribbon is 0.3 mm, and the width thereof is 3.1 mm) cited for comparison in the description of the above-described first embodiment.

As described above, according to the optical fiber cable in which the optical fiber ribbon 1 of the first embodiment or the optical fiber ribbon 2 of the second embodiment is mounted (for example, the tube type optical fiber cable 3 or the slot type optical fiber cable 4), it is possible to improve the mounting density of the optical fiber. Alternatively, when the number of optical fibers to be mounted (the number of cores) is the same, the optical fiber cable in which the optical fiber ribbon 1 of the first embodiment or the optical fiber ribbon 2 of the second embodiment is mounted can have an outer diameter smaller than that of the optical fiber cable of the related art.

As described above, the present disclosure has been described in detail and with reference to specific embodiments, and it is apparent to those skilled in the art that various modifications and corrections can be made without departing from the spirit and scope of the present disclosure. The number, position, and shape of the above-described components are not limited to the embodiments, but can be changed to the number, position, and shape suitable for performing the present disclosure.

REFERENCE SIGNS LIST 1, 2: optical fiber ribbon
3, 4: optical fiber cable
11A to 11X, 21A to 21L: optical fiber
12, 22: connection part
13, 23: non-connection part
14: inner layer resin
15: outer layer resin
24: resin
31, 43: tension member
32: tube
33: interposition
41: slot groove
42: slot rod
44: press-winding tape
45: jacket
51: glass fiber
52a: inner coating layer
52b: outer coating layer

The invention claimed is:

1. An optical fiber ribbon, comprising:
N pieces of optical fibers in a state of being disposed in parallel, wherein
at least some pieces of the N pieces of optical fibers contact each other and are connected to each other by a resin,
an outer diameter of each optical fiber is equal to or larger than 0.135 mm and equal to or smaller than 0.180 mm,
a connection part connected by the resin or another resin and a non-connection part not connected by the resin or another resin are intermittently provided in a longitudinal direction between intermittently connected core wires of an optical fiber disposed at the Mth and an optical fiber disposed at the (M+1)th among the N pieces of optical fibers,
N is a multiple of 12,
M is a multiple of 4 and
other than between the intermittently connected core wires of the optical fiber disposed at the Mth and the optical fiber disposed at the (M+1)th among the N pieces of optical fibers, the optical fibers are continuously connected to each other by the resin or the another resin in the longitudinal direction.

2. The optical fiber ribbon according to claim 1, wherein a thickness of the optical fiber ribbon is equal to or smaller than 0.21 mm, and a thickness of the resin is equal to or larger than 0.005 mm.

3. The optical fiber ribbon according to claim 1, wherein M is a multiple of 12, and N is greater than M.

4. The optical fiber ribbon according to claim 1, wherein a distance between the centers of the optical fibers adjacent to each other in the N pieces of optical fibers is equal to or larger than 0.135 mm and equal to or smaller than 0.180 mm.

5. The optical fiber ribbon according to claim 1, wherein the resin is formed of an inner layer resin and an outer layer resin, and
the optical fiber disposed at the Mth and the optical fiber disposed at the (M+1)th are not connected to each other by the inner layer resin in the longitudinal direction, but are intermittently connected to each other by the outer layer resin in the longitudinal direction between the intermittently connected core wires.

6. An optical fiber cable, comprising:
a plurality of optical fiber ribbons according to claim 1, wherein
core density obtained by dividing the number of optical fibers by a cross-sectional area of the optical fiber cable is equal to or higher than 6 cores/mm$^2$.

7. The optical fiber cable according to claim 6, wherein, the plurality of optical fiber ribbons are covered with a tube.

8. The optical fiber cable according to claim 6, further comprising:
a slot rod including a plurality of slot grooves; and
the plurality of optical fiber ribbons, wherein
the plurality of optical fiber ribbons are respectively stored in the slot grooves.

* * * * *